United States Patent
Yamamoto

(10) Patent No.: US 6,801,892 B2
(45) Date of Patent: Oct. 5, 2004

(54) METHOD AND SYSTEM FOR THE REDUCTION OF PROCESSING TIME IN A SPEECH RECOGNITION SYSTEM USING THE HIDDEN MARKOV MODEL

(75) Inventor: Hiroki Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

(21) Appl. No.: 09/817,039

(22) Filed: Mar. 27, 2001

(65) Prior Publication Data

US 2001/0032075 A1 Oct. 18, 2001

(30) Foreign Application Priority Data

Mar. 31, 2000 (JP) ........................................ 2000-099536

(51) Int. Cl.[7] .............................................. G10L 15/18
(52) U.S. Cl. ........................................ 704/256; 704/254
(58) Field of Search .............................. 704/256, 254, 704/243, 251

(56) References Cited

U.S. PATENT DOCUMENTS

| | | | | |
|---|---|---|---|---|
| 5,390,278 A | * | 2/1995 | Gupta et al. ................. | 704/243 |
| 5,706,391 A | * | 1/1998 | Yamada et al. .............. | 704/231 |
| 5,787,396 A | * | 7/1998 | Komori et al. .............. | 704/256 |
| 5,799,278 A | * | 8/1998 | Cobbett et al. .............. | 704/256 |
| 5,903,865 A | * | 5/1999 | Ishimitsu et al. ........... | 704/256 |
| 5,940,794 A | * | 8/1999 | Abe ............................. | 704/253 |
| 5,956,676 A | * | 9/1999 | Shinoda ....................... | 704/244 |
| 5,956,679 A |  | 9/1999 | Komori et al. .............. | 704/256 |
| 5,970,445 A |  | 10/1999 | Yamamoto et al. .......... | 704/230 |
| 5,970,453 A | * | 10/1999 | Sharman ...................... | 704/260 |
| 5,983,180 A | * | 11/1999 | Robinson ..................... | 704/254 |
| 6,456,970 B1 | * | 9/2002 | Kao ............................. | 704/256 |

* cited by examiner

Primary Examiner—Susan McFadden
Assistant Examiner—Michael Lewis
(74) Attorney, Agent, or Firm—Fitzpatrick, Cella, Harper & Scinto

(57) ABSTRACT

Disclosed is a speech recognition method in a speech recognition apparatus to applying speech recognition to a voice signal applied thereto. The input voice signal is converted from an analog to a digital signal and sequences of feature vectors are extracted based upon the digital signal (S12). A search space is defined by the sequences of feature vectors and an HMM (16) prepared beforehand for each unit of speech. The search space allows a transition between HMMs only in specific feature-vector sequences. A search is conducted in this space to find an optimum path for which the largest acoustic likelihood regarding the voice signal is obtained to find the result of recognition (S14), and this result is output (S15).

8 Claims, 7 Drawing Sheets aki aka

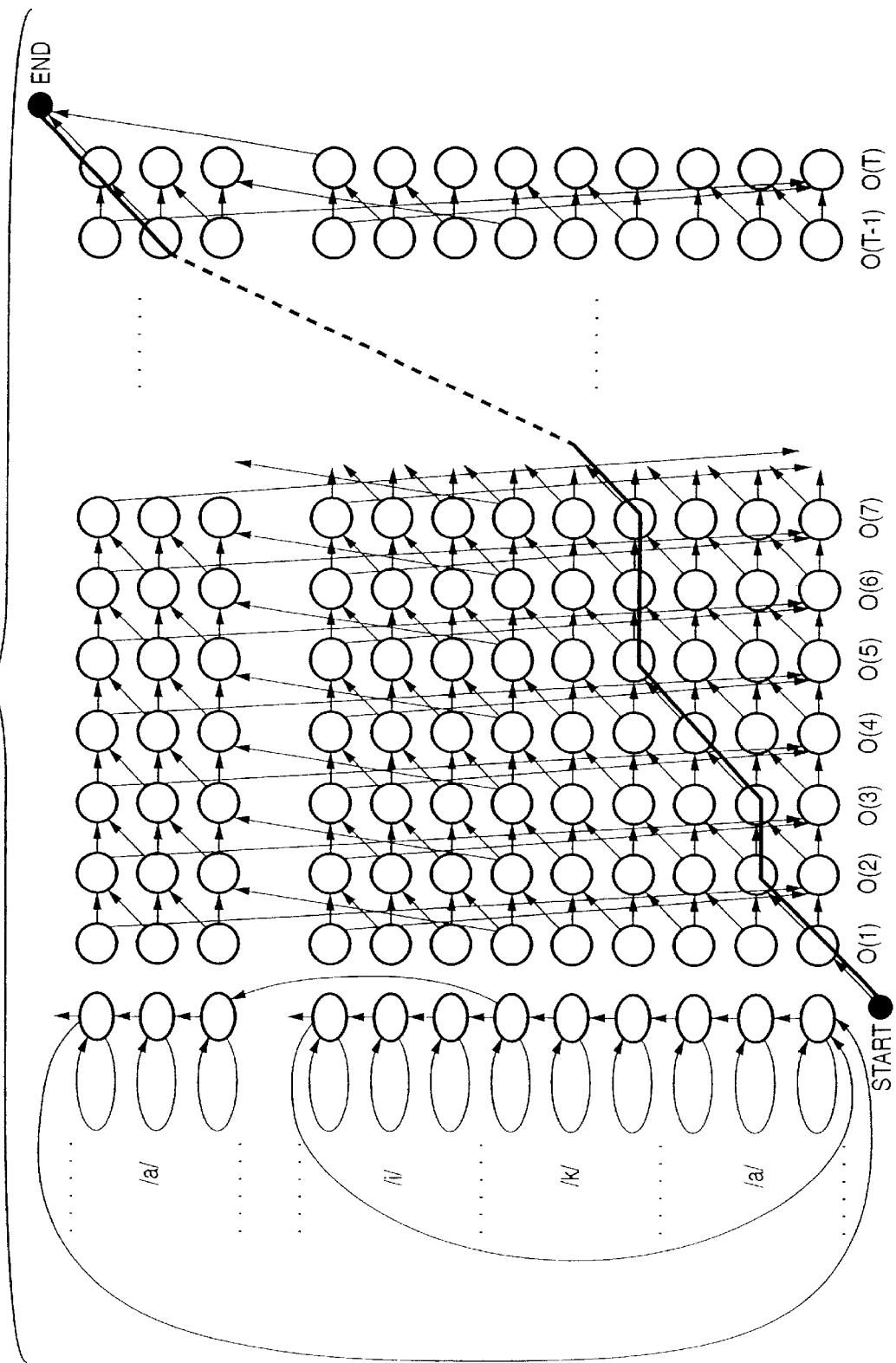

US 6,801,892 B2

METHOD AND SYSTEM FOR THE REDUCTION OF PROCESSING TIME IN A SPEECH RECOGNITION SYSTEM USING THE HIDDEN MARKOV MODEL

FIELD OF THE INVENTION

This invention relates to a speech recognition method and apparatus using a Hidden Markov Model, a program for executing speech recognition by computer, and a storage medium from which the stored program can be read by a computer.

BACKGROUND OF THE INVENTION

Methods using the Hidden Markov Model (referred to as "HMM" below) are the focus of continuing research and application as effective methods of speech recognition, and many speech recognition systems are currently in use.

FIG. 6 is a flowchart illustrating an example of conventional speech recognition using an HMM.

Step S1, which is a voice input step, subjects a voice signal that has been input from a microphone or the like to an analog-to-digital conversion to obtain a digital signal. Step S2 subjects the voice signal obtained by the conversion at step S1 to acoustic analysis and extracts a time series of feature vectors. In acoustic analysis, an analytical window having a window width of 30 ms is provided for a voice signal, which is a continuous waveform that varies with time, and the voice signal is subjected to acoustic analysis while the analytical window is shifted by one-half to one-third the window width (i.e., 10 to 15 ms). The analytical results within each of the windows are output as feature vectors. The voice signal is converted to feature-vector sequences $O(t)$ ($1 \leq t \leq T$), wherein t represents the frame number.

Next, processing proceeds to step S3. This step includes generating a search space, in which the two axes are HMM state sequences and feature-vector sequences of the input voice, by using an HMM database 5, which stores HMMs comprising prescribed structural units, and a dictionary 6 that describes the corresponding relationship between words to be recogized and HMM state sequences, and finding an optimum path using Viterbi algorithm for which the maximum acoustic likelihood is obtained, in this search space.

The details of a procedure for the search will be described with reference to FIG. 7.

FIG. 7 illustrates search space and the manner in which the search is conducted in a case where two words "aki" and "aka" are subjected to continuous speech recognition using phoneme HMMs. In FIG. 7, horizontal axis shows an example of feature-vector sequences and the vertical axis shows an example of the HMM state sequences.

First, HMM state sequences corresponding to one or more words to undergo recognition are generated from the HMM database 5 and dictionary 6, which describes the corresponding relationship between words to be recogized and the HMM state sequences. The HMM state sequences thus generated are as shown along the vertical axis in FIG. 7.

A two-dimensional, grid-like search space is formed from the HMM state sequences thus generated and feature-vector sequences.

Next, with regard to all paths that originate from "START" and arrive at "END" in the search space of FIG. 7, an optimum path for which the maximum cumulative acoustic likelihood will be obtained is found from the state output probability at each grid point and HMM state transition probability corresponding to a transition between grid points.

Then, with regard to each of the grid points (state hypotheses) in search space, the cumulative acoustic likelihoods (state-hypothesis likelihoods) up to arrival at the respective grid points are calculated in numerical order from $t=1$ to $t=T$. A state-hypothesis likelihood $H(s,t)$ of state s of frame t is calculated by the following equation:

$$H(s,t) = \max H(s',t-1) \times a(s',s) \times b[s,O(t)] \quad s' \in S'(s) \quad \text{Eq. (1)}$$

where $S'(s)$ represents a set of states connected to state s, $a(s',s)$ represents the transition probability from state s' to state s, and $b[s,O(t)]$ represents the state output probability of state s with respect to a feature vector $O(t)$.

By using the state-hypothesis likelihood calculated above, the acoustic likelihood of the optimum path leading to "END" is calculated in accordance with the following equation:

$$\max H(s,T) \times a(s,s') \quad s \in Sf \quad \text{Eq. (2)}$$

where Sf represents a set of phoneme HMM states for which arrival at "END" is possible, i.e., a set of HMM final states representing each of the words to be recognized. Further, $a(s,s')$ denotes the probability of a transition from state s to other states.

When the state-hypothesis likelihood of each state hypothesis is calculated in the calculation process described above, the states of the origins of transitions [s' in Equation (1)] for which the state-hypothesis likelihood is maximized are stored and the optimum path for which the maximum acoustic likelihood is calculated by tracing the stored values.

The HMM state sequences corresponding to the optimum path found through the above-described procedure are obtained and the recognized words corresponding to these state sequences are adopted as the results of recognition. In a case where the path indicated by the bold line in FIG. 7 is the optimum path for which the maximum cumulative acoustic likelihood is obtained, this path traverses the states of phoneme HMM /a/ /k/ /a/ and therefore the result of speech recognition in this instance is "aka".

Finally, processing proceeds to step S4 in FIG. 6, where the result of recognition is displayed on a display unit or delivered to another process.

The search space shown in FIG. 7 increases in size in proportion to the number of words to be recognized and the duration of the input speech. This enlargement of the search space is accompanied by an enormous increase in the amount of processing needed to search for the optimum path. As a consequence, the response speed of speech recognition declines when implementing speech recognition applied to a large vocabulary and when implementing speech recognition using a computer that has an inferior processing capability.

SUMMARY OF THE INVENTION

Accordingly, an object of the present invention is to provide a speech recognition method, apparatus and storage medium wherein high-speed speech recognition is made possible by reducing the amount of processing needed for speech-recognition search processing.

According to the present invention, a speech recognition method for attaining the foregoing object comprises a speech recognition method comprising the steps of: extracting sequences of feature vectors from an input voice signal;

and subjecting the voice signal to speech recognition using a search space in which an HMM-to-HMM transition is not allowed in specific feature-vector sequences.

Further, a speech recognition apparatus for attaining the foregoing object comprises a speech recognition apparatus comprising: extraction means for extracting sequences of feature vectors from an input voice signal; and recognition means for subjecting the voice signal to speech recognition using a search space in which an HMM-to-HMM transition is not allowed in specific feature-vector sequences.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 7 is a diagram useful in describing search processing paths in a speech recognition method according to the prior art.

DESCRIPTION OF THE PREFERRED EMBODIMENT

A preferred embodiment of the present invention will now be described in detail with reference to the accompanying drawings.

Figure 1:
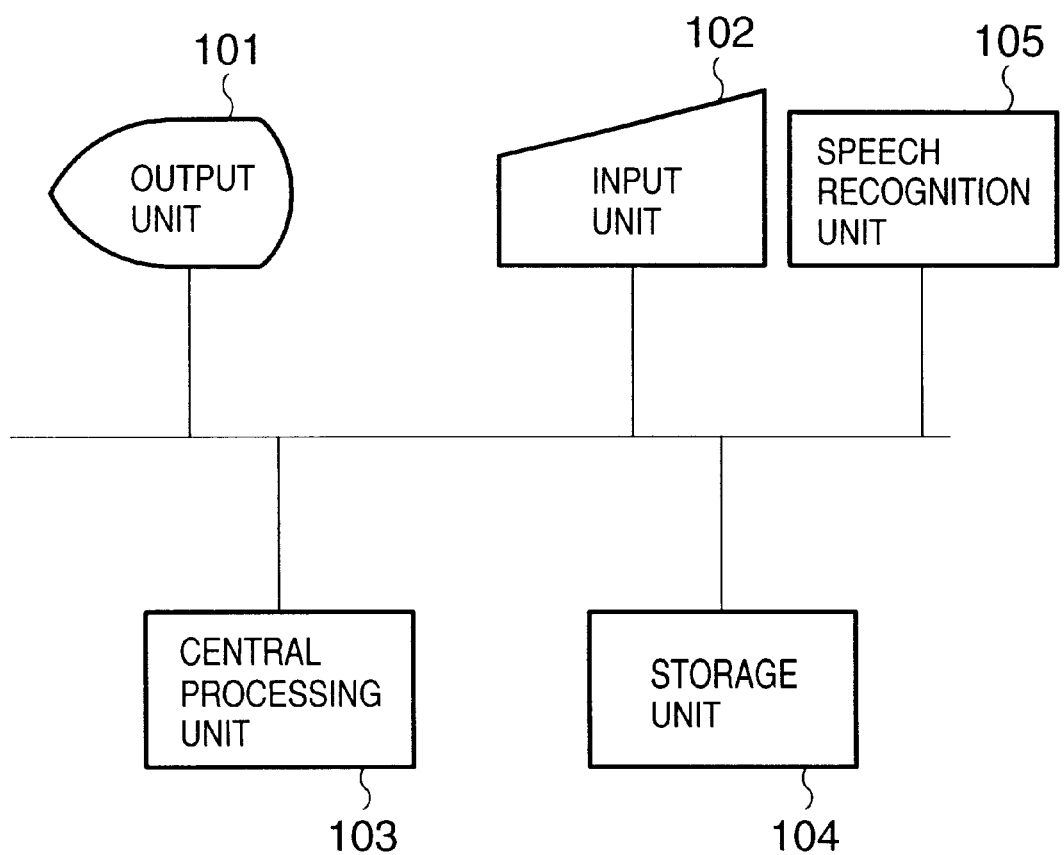
FIG. 1 is a block diagram illustrating the hardware implementation of a speech recognition apparatus according to an embodiment of the present invention.

FIG. 1 is a block diagram illustrating the hardware implementation of a speech recognition apparatus according to an embodiment of the present invention.

As shown in FIG. 1, the apparatus includes an output unit 101, which includes a display or printer, etc., for outputting the result of speech recognition or a response (document data) obtained from the result of speech recognition, and an input unit 102, which is adapted to input voice from a microphone or the like and to input various data in response to operation by an operator using a keyboard and mouse, etc. The apparatus further includes a central processing unit (CPU) 103 for calculating numerical values and controlling the overall operation of the speech recognition, and a storage unit 104, which includes an external memory device such as a disk drive and an internal memory such as a RAM or ROM, for storing a control program (illustrating in FIG. 2) for executing the procedure and processing of this embodiment. Also stored in the storage unit 104 are temporary data necessary for processing, a dictionary indicating the corresponding relationship between words to be recognized and HMMs, and the HMMs, etc. The apparatus further includes a speech recognition unit 105.

The operation of the speech recognition unit 105 will now be described.

This embodiment will be described with regard to a case where input voice is subjected to continuous speech recognition using the state sequences of HMMs, in which the structural units of the HMMs are assumed to be phonemes and "aka", "aki" are assumed to be the words undergoing recognition.

Figure 4:
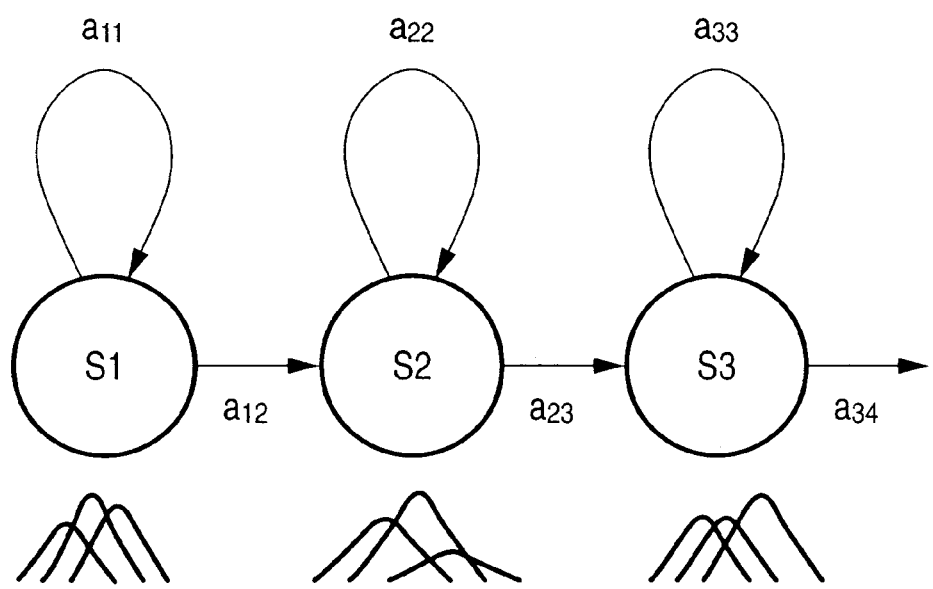
FIG. 4 is a diagram useful in describing a Hidden Markov Model.
Figure 5:
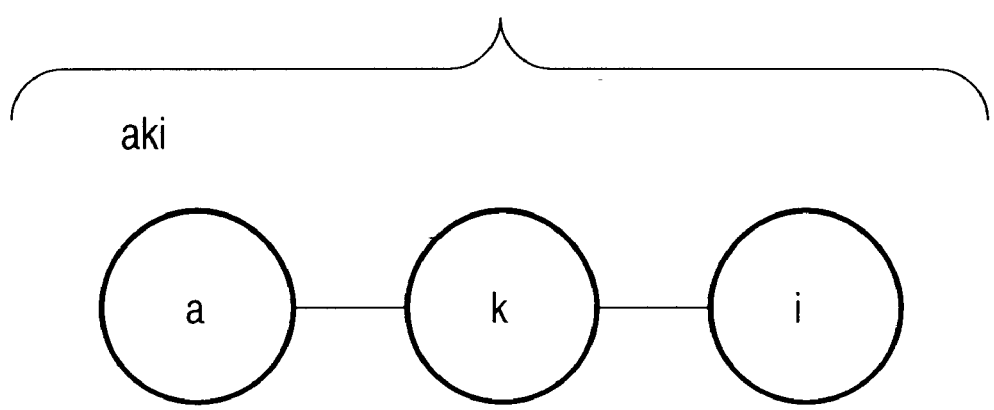
FIG. 5 is a diagram illustrating the manner in which words to be recognized are constructed by a plurality of phoneme models.
Figure 5:
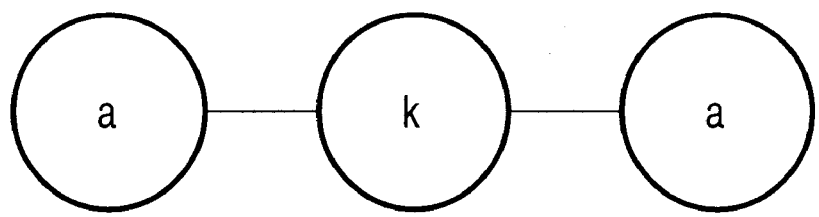

FIG. 5 is a diagram illustrating the words to be recognized in this embodiment. Each word is composed of phoneme HMMs, and each phoneme HMM is constructed as a linkage of a plurality of states, as shown in FIG. 4.

In FIG. 4, three states (S1, S2 and S3) are illustrated. Self-loop probability at state S1 is indicated by $a_{11}$, and the transition probability from state S1 to state S2 is indicated by $a_{12}$. By using the Viterbi algorithm, the scores of paths within the search space are found based upon the transition probabilities between these states and then a search is conducted for the path that will afford the largest cumulative value (likelihood) of the score values.

Figure 2:
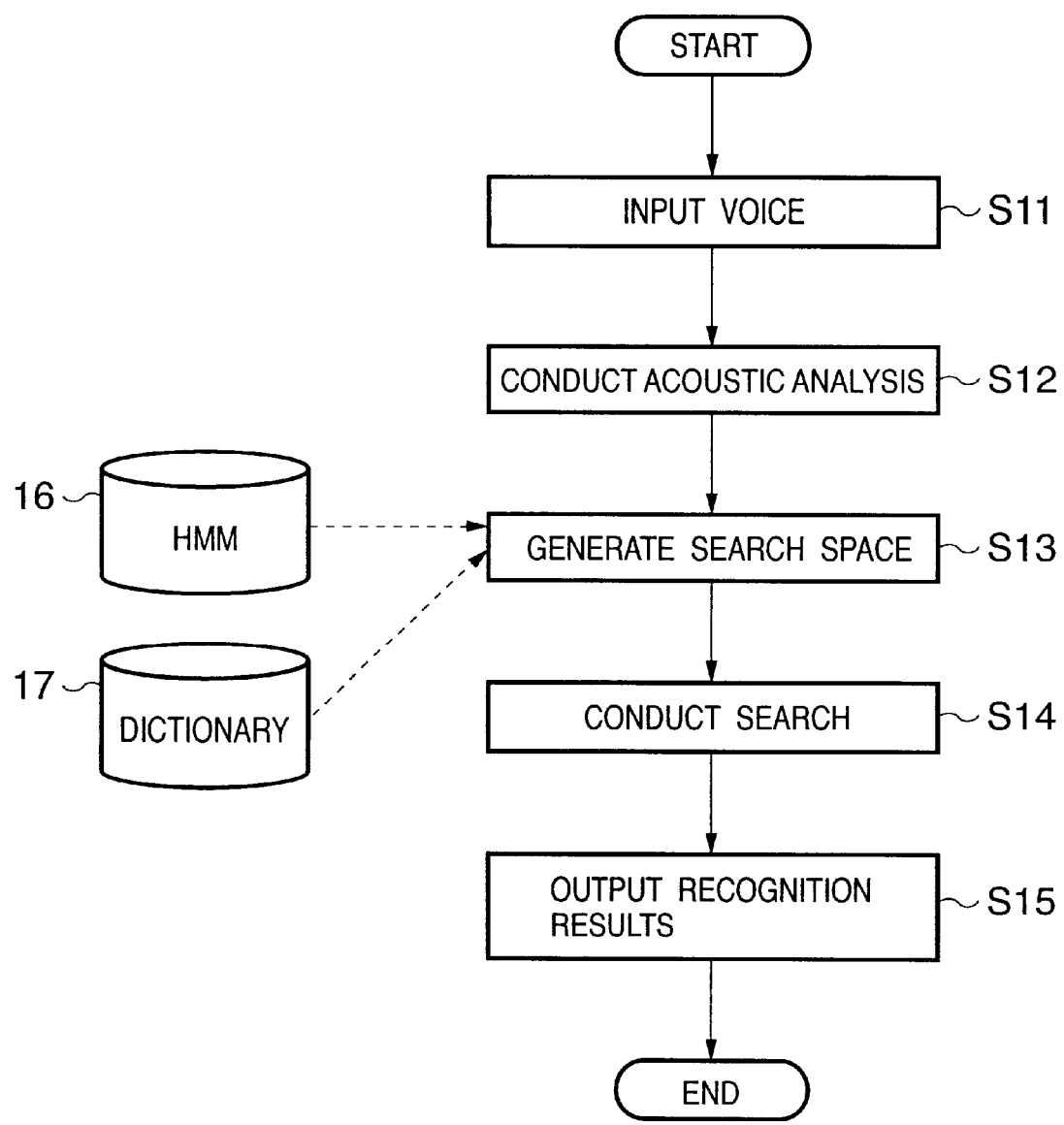
FIG. 2 is a flowchart illustrating speech recognition processing executed by the speech recognition apparatus according to an embodiment of the present invention.
Figure 6:
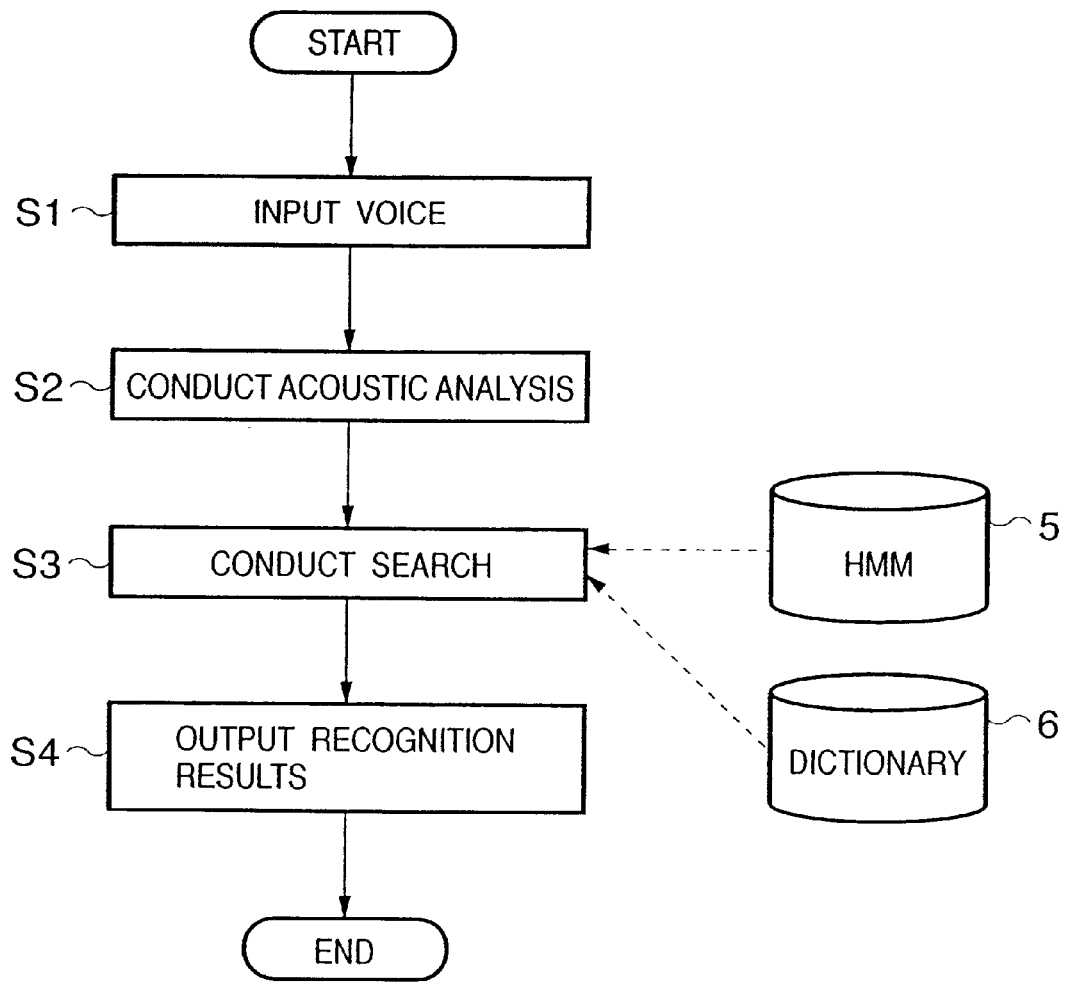
FIG. 6 is a flowchart illustrating the procedure of speech recognition processing according to the prior art.

FIG. 2 is a flowchart illustrating speech recognition processing executed by the speech recognition unit 105 according to this embodiment. It should be noted that steps similar to those of the speech recognition method using the HMM of FIG. 6 will not be described in detail again. The description will start from search processing, which follows the extraction of feature-vector sequences $O(t)$ $(1 \leq t \leq T)$ from input voice by the voice input processing at step S11 (with corresponds to step S1 in FIG. 6) and the acoustic analysis processing of step S12 (which corresponds to step S2).

Processing proceeds from step S12 to step S13, which is processing for generating search space. Specifically, state sequences of HMMs corresponding to one or more words to be recognized are generated using an HMM database 16, which stores HMMs in which phonemes are the structural units, and a dictionary 17 that describes the corresponding relationship between words to be recogized and HMM state sequences, and generates a two-axis search space comprising feature-vector sequences $O(t)$ and HMM state sequences (see FIGS. 3 and 7).

Figure 3:
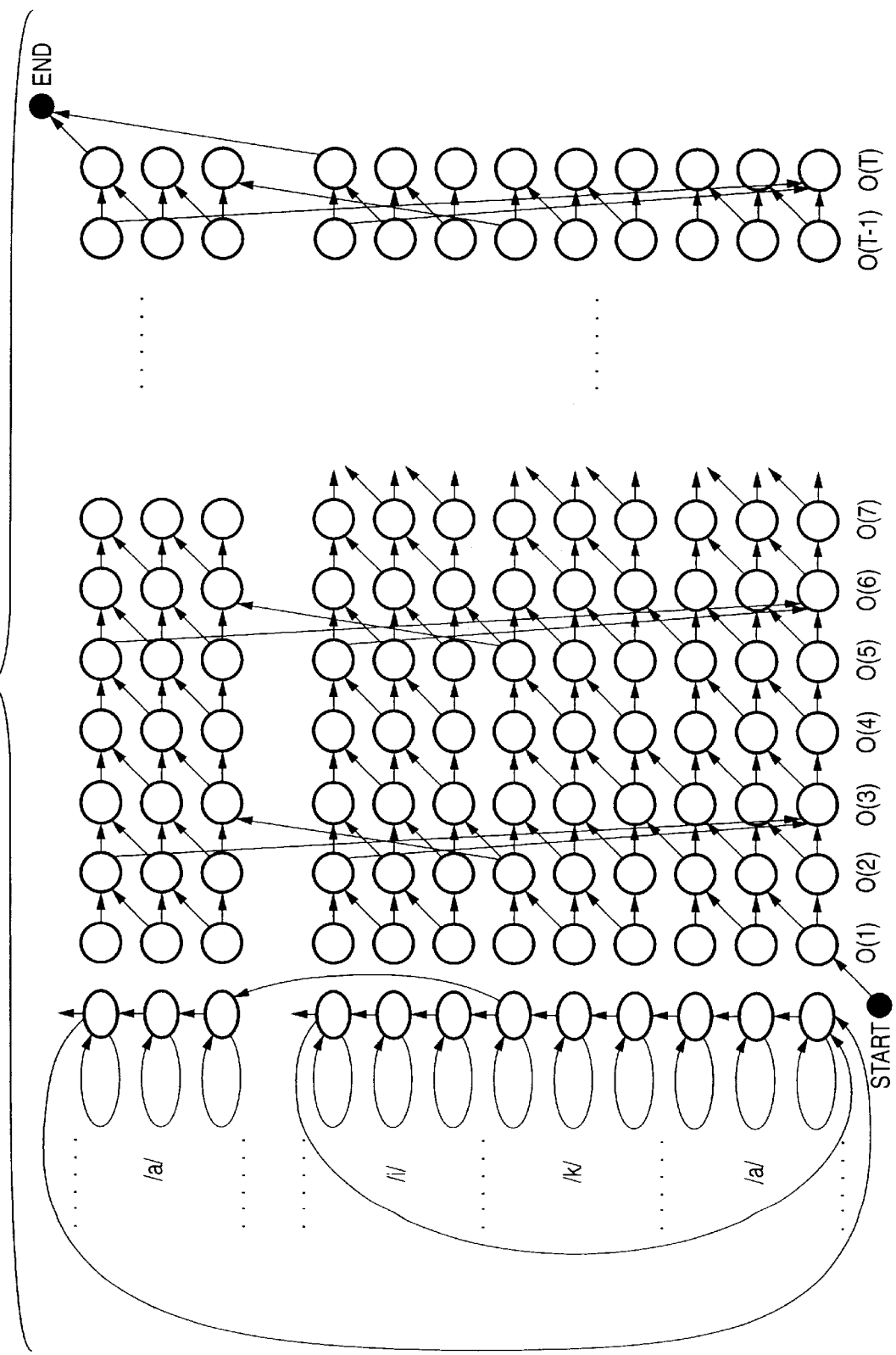
FIG. 3 is a diagram useful in describing paths for executing search processing according to an embodiment of the present invention.

FIG. 3 is a diagram useful in describing paths for executing search processing in the speech recognition apparatus according to this embodiment.

The embodiment shown in FIG. 3 and the prior-art example of FIG. 7 differ in that when the search space is generated in FIG. 3, HMM-to-HMM transitions are allowed only in specific frames; an HMM-to-HMM transition is not allowed in frames other than these specific frames. As a result, it is possible to reduce the number of paths that are to be searched, and this in turn makes it possible to raise processing speed. By way of example, here the frames which allow the HMM-to-HMM transition are set in such a manner that the frame interval will be N ($2 \leq N \leq 4$).

In the example of FIG. 3, N=3 is assumed to hold and the search space is established so as to allow the HMM-to-HMM transition every three frames. In comparison between FIGS. 3 and 7, the number of paths transit between HMMs in FIG. 3 is much less than the number of the paths in FIG. 7.

According to the example of FIG. 3, the HMMs representing each of the phonemes (/a/, /k/, /i/) have three states and a transition from one HMM to another occurs in accordance with a predetermined transition rule. In this embodiment, a transition between these HMMs is allowed every N (=3) frames. More specifically, an HMM-to-HMM transition is allowed only in feature-vector sequences O(2), O(5), O(8), . . . , O(T−1).

Next, processing proceeds to step S14. Here, with regard to all paths that originate from "START" and arrive at "END" in the search space of FIG. 3, the cumulative likelihood of each state hypothesis is calculated from the state output probability and the state transition probability corresponding to the transition between each of the grid points. Then, the optimum path which has the maximum cumulative acoustic likelihood is found. The method of searching for optimum path is processing similar to that of step S3 in FIG. 6 and need not be described here. At step S14, however, the frames at which the HMM-to-HMM transition is allowed are determined in advance. As a result, the amount of calculation needed to calculate likelihood in this search processing is reduced in comparison with step S3 of FIG. 6.

The recognized words of the HMM sequences on the optimum path thus found are adopted as the results of recognition. These results are displayed on the display of output unit 101 or are delivered to other processing at the output processing of step S15.

Thus, in accordance with this embodiment as described above, an HMM-to-HMM transition is allowed every N frames when search space is generated using the sequences of feature vectors and the HMM state sequences, thereby making it possible to reduce the number of paths searched so that a higher speech recognition speed can be achieved.

This embodiment has been described with regard to a case where a transition between HMMs is allowed every N (N=3) frames at step S13 in FIG. 2. However, this does not impose a limitation upon the invention. For example, taking into consideration the fact that the above-described search space grows in size with an increase in the number of words to be recognized or with an increase in duration of input speech, the frame interval at which the HMM-to-HMM transition is allowed can be enlarged in stages within the range $2 \leq N \leq 4$ in accordance with the increase in number of words or increase in duration of input speech. Further, taking into consideration both an increase in the number of words to be recognized and an increase in duration of input speech, the frame interval can also be changed in stages within the range $2 \leq N \leq 4$. By adopting this arrangement, a reduction in the number of search paths can be performed adaptively in dependence upon the scale of the search space, thereby making it possible to raise the speed of recognition processing.

Further, step S13 in this embodiment has been described with regard to a case where a transition between HMMs is allowed every N (N=3) frames with respect to all HMMs that are present with the HMM state sequences. However, this does not impose a limitation upon the invention. For example, the frame interval at which the HMM-to-HMM transition is allowed can be changed within the range $2 \leq N \leq 4$ between prescribed HMMs. Further, it is possible to vary the frame interval every prescribed number of feature-vector sequences. This will make it possible to change the frame interval, using one frame interval for HMMs for which the frequency of transition to another HMM is high and using another frame interval for HMMs for which the frequency of transition to another HMM is low. As a result, a smaller search space can be achieved.

Though the structural units of an HMM are described as being phonemes in the above embodiment, this does not impose a limitation upon the invention. For example, vocalized sounds such as syllables, demi-syllables, words and diphones may be adopted as the structural units.

Further, though an example in which words in the Japanese language are recognized has been described, this does not impose any limitation and the invention is applicable to other languages as well.

The present invention can be applied to a system constituted by a plurality of devices (e.g., a host computer, interface, reader, printer, etc.) or to an apparatus comprising a single device (e.g., a copier or facsimile machine, etc.).

The present invention is not limited solely to the above-described apparatus and method that implement the foregoing embodiment. The scope of the present invention covers also a case where the program codes of software for implementing the foregoing embodiments are supplied to a computer (CPU or MPU) in a system or apparatus and the computer of the system or apparatus is made to operate the various above-mentioned devices in accordance with the program code.

In this case, the program codes of the program per se implement the functions of the foregoing embodiment, and the program codes per se as well as the means for supplying these program codes to the computer, i.e., the storage medium on which these program codes have been stored, fall within the scope of the present invention.

Examples of storage media that can be used for supplying the program code are a floppy disk, hard disk, optical disk, magneto-optical disk, CD-ROM, magnetic tape, non-volatile type memory card or ROM, etc.

Furthermore, besides the case where the aforesaid functions according to the embodiment are implemented by controlling the various devices in accordance solely with the supplied program codes, the scope of the present invention covers a case where the program codes cooperate with an operating system running on the computer or with other application software or the like to implement the foregoing embodiments.

Furthermore, the scope of the present invention further covers also a case where, after the program codes read from the storage medium are written in a function expansion board of a computer or in a memory provided in a function expansion unit connected to the computer, a CPU or the like contained in the function expansion board or function expansion unit performs a part of or the entire process in accordance with the designation of program codes and implements the functions of the above embodiments.

Thus, in accordance with the embodiment as described above, an HMM-to-HMM transition is allowed only in specific frames when a search space for searching for maximum-likelihood state sequences is formed. As a result, paths to be searched can be reduced and it is possible to reduce the processing needed to search for the optimum path.

The present invention is not limited to the above embodiment and various changes and modifications can be made within the spirit and scope of the present invention. Therefore, to apprise the public of the scope of the present invention, the following claims are made.

What is claimed is:

1. A speech recognition method comprising the steps of:
   extracting sequences of feature vectors from an entered voice signal; and subjecting the voice signal to speech recognition using a search space in which an HMM-to-HMM transition is not allowed in specific feature-vector sequences, wherein the search space allows an HMM-to-HMM transition only every N-number of feature-vector sequences.

2. The method according to claim 1, wherein the value of N falls within the range $2 \leq N \leq 4$.

3. The method according to claim 1, wherein the HMM corresponds to any of a phoneme, syllable, demi-syllable, word or diphone.

4. A program executed by a computer, said program comprising:

program code of a step of extracting sequences of feature vectors from an entered voice signal; and program code of a step of subjecting the voice signal to speech recognition using a search space in which an HMM-to-HMM transition is not allowed in specific feature-vector sequences;

wherein the search space allows an HMM-to-HMM transition only every N-number of feature-vector sequences.

5. A storage medium storing a program executed by a computer, said storage medium comprising:

program code of a step of extracting sequences of feature vectors from an entered voice signal; and program code of step of subjecting the voice signal to speech recognition using a search space in which an HMM-to-HMM transition is not allowed in specific feature-vector sequences;

wherein the search space allows an HMM-to-HMM transition only every N-number of feature-vector sequences.

6. A speech recognition apparatus comprising:

extraction means for extracting sequences of feature vectors from an entered voice signal; and recognition means for subjecting the voice signal to speech recognition using a search space in which an HMM-to-HMM transition is not allowed in specific feature-vector sequences, wherein the search space allows an HMM-to-HMM transition only every N-number of feature-vector sequences.

7. The apparatus according to claim 6, wherein the value of N falls within the range $2 \leq N \leq 4$.

8. The apparatus according to claim 6, wherein the HMM corresponds to any of a phoneme, syllable, demi-syllable, word or diphone.

* * * * *